Patented June 25, 1946

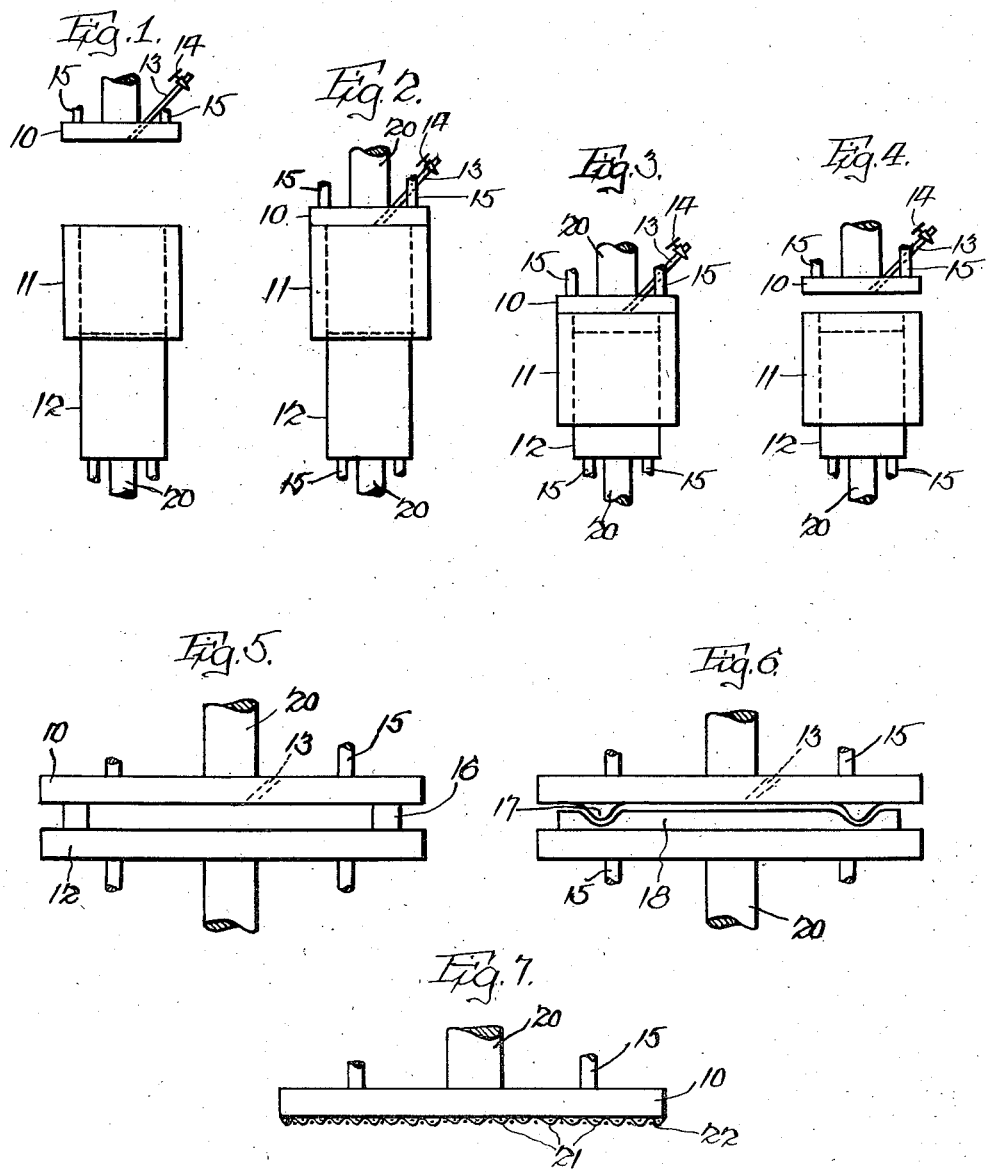

2,402,554

UNITED STATES PATENT OFFICE 2,402,554

MOLDED PRODUCT AND METHOD OF MAKING

Fergus A. Irvine and Emile Frederick, Jr., New Orleans, La., assignors to The Celotex Corporation, Chicago, Ill., a corporation of Delaware Application May 25, 1936, Serial No. 81,605

16 Claims. (Cl. 18—47.5)

The primary object of this invention is the provision of a new and improved molded product and method of producing such products directly from cellulosic fibers as the primary material without the addition of added binder or binder forming substances. It is proposed, according to the inventions disclosed herein, that by following the processes herein described, there may be manufactured hard, dense, and strong products which result from re-actions involving only the substances of the cellulosic fibers comprising the raw materials hereof, brought about through the particular processes of manufacture as hereinafter described.

Other and further objects of the inventions hereof are the provision of various forms and modifications of the process, illustrating to at least a limited extent the possibilities of the process and of the product disclosed.

Further as objects of the invention hereof there are included many and various modifications and variations of the basic product hereof comprising products produced by modification of the basic raw material by the admixture of additional reactive or extending substances thereto and by various admixtures of modifying and additional substances with the basic raw material.

Within the past few years there has grown up an extensive industry in connection with the manufacture of synthetic resins and synthetic resin products, which resins may generally be described as condensation reaction products and which molded products may be generally described as generally comprising combinations of such synthetic resins including more or less filler and/or reinforcing material such as wood fiber, paper fiber, paper, cloth, cotton fiber, asbestos, and the like. This synthetic resin development began primarily in connection with the phenol formaldehyde type resin and has subsequently developed to include many other types of condensation resins including the furfural resins, the urea resins, and the numerous types which are known to those skilled in the art and much literature concerning which has been published.

In the past, the production of the products generally referred to as synthetic resin molded products have involved at least three separate stages of manufacture; first, comprising the manufacture of the synthetic resin polymerized to an appropriate degree; second, comprising the combination of the synthetic resin with the filler material; and third, the molding of this mixture of resin and filler. It is the particular object of this invention to produce a resin containing molded product as a single stage process of manufacture and thereby avoid what, in connection with this invention, are unnecessary steps in the process of manufacture.

According to the invention, the basic or raw material utilized in the process is a substantially raw or natural cellulosic fiber such as the fiber of sugar cane, corn stalks, wood fiber (the fiber of trees), and others of the cellulosic fibers containing the natural substances of growth which, for want of a more specific designation, are ordinarily referred to as ligno-cellulose fibers. According to the basic process hereof, these fibers are utilized in substantially their natural state with only sufficient preliminary preparation as may be necessary to disintegrate the raw material into a particle or fibrous form of the fineness required to produce a finished article of the desired finished characteristics as regards the form or shape thereof and degree of physical structure as regards density, surface appearance, and the like. For a dense product it will be necessary that the raw material be quite finely sub-divided, whereas, on the other hand, if the finished material need not be of as high density, and some degree of surface irregularities is permissible, then the raw material need not be so finely subdivided and may be proportionately relatively coarse.

The raw material is used in its form in which it is produced by nature except insofar as it is altered in the steps of disintegration into particles for use in accordance with the process hereof. As an example, sugar cane fiber utilized as bagasse, or the refuse fiber from the sugar mills after the extraction of sugar, may advantageously be softened by a short period of digestion with water as, for example, by digestion in water at about 40 lbs. steam pressure for a period of one to two hours, which digestion merely serves to soften the fiber but in the course of which there will be removed from the fiber a large proportion of the water solubles which are but a relatively small proportion of the total raw material. The bagasse fiber which has been softened by the digestion (really but a steaming) as described, may then be run through appropriate refining equipment such as swing hammer shredders, Claflin refiners, and the like, which refining equipment will reduce the material to a condition of more or less separated fibers depending upon the degree of refining to which the material is subjected. As distinguished from this manner of sub-dividing the raw material as has been just described, and as an advantageous manner of preparing the raw materials in connection with certain types of molding, the raw material may, without the preliminary digestion or steaming, be passed through appropriate grinding apparatus to reduce the raw material to a particle form of a more or less flour-like character, which reduced floury or powdery material may be used in subsequent steps of the process.

By the use of the process of manufacture herein disclosed, it becomes unnecessary in the manufacture of synthetic resin containing molded products to first prepare a synthetic resin and a filler material, which two substances are subsequently mixed and molded and, as distinguished from such procedure, the process hereof discloses a method of procedure wherein the product is produced by a single step operation.

In order that the process disclosed may be better visualized, and in order to illustrate in general the type of apparatus which may be used, a diagrammatic drawing accompanies this specification.

In the drawing:

Figures 1, 2, 3, and 4 are diagrammatically illustrative of an apparatus used in the practice of the invention, the successive figures being illustrative of successive steps in the process of production of the molded product hereof.

Figure 5 is a diagrammatic illustration of an alternative form of the press apparatus illustrating a particular form of press seal.

Figure 6 is a diagrammatic showing of a further manner of press seal.

Figure 7 is a diagrammatic showing of a still further type of press seal.

In the production of a molded product, in accordance with this invention, the raw material, fibrous cellulosic growth, such as sugar cane, bagasse, corn stalks, wood, or other vegetative growth, may be, through softening by steaming and refining, grinding, or the like, reduced to a powdery or fibrous state and is charged into a mold 11 which, as illustrated, is designed to produce a wafer-like final molded product.

Mold 11, when filled with the fibrous or powdery cellulosic substance, is closed by bringing down thereon plate 10, as illustrated in Figure 2, which, as will be seen from inspection of the drawing, provides a mold filled with the cellulosic material and sealed at the top by plate 10 and at the bottom by ram 12. Both plate 10 and ram 12 are cored or otherwise provided with passages therethrough for the purpose of circulating a medium which may pass in through one of the pipes indicated at 15 and out of the other pipe 15 which are provided as inlets to and discharge pipes from the cores or passages of the plate and ram. The heating medium may be any heated fluid or gas which can be circulated through the cored portions of the plate and ram at sufficient temperatures to provide and maintain the desired temperatures of the plate and the ram, which desired temperatures are those corresponding to the temperatures of steam between the pressures of 125 lbs. to 150 lbs., more or less, the extreme range apparently being approximately between the temperatures corresponding to steam pressures of 110 lbs. to 190 lbs., that is, temperatures of between about 345° to 395° F. While it has been stated that substantially any circulating medium may be utilized to supply the necessary heat to the plate and ram, this is, of course, to be qualified that such gas or fluid must have a specific heat sufficient to supply the necessary heat within the limitations of the amount of such gas or fluid that may be circulated into and out of supply and discharge pipes 15.

With the mold 11 filled and the plate 10 and ram 12 heated, in accordance with the above directions, and with the mold containing nothing but the prepared fibrous or floury material as above described, with its natural atmospheric moisture content of substantially 7% to 11%, pressure is then applied through the plungers 20 attached to plate 10 and ram 12 to compress the material within the mold 11, which pressure should be preferably about 1,000 pounds per square inch over the area of the ram face with a minimum of around 500 or 600 pounds per square inch and an apparent practical maximum of about 1,500 pounds per square inch, although apparently this stated maximum can be exceeded without unfavorable results provided that the desired characteristics of the materials used and product desired require the use of such higher pressures and it is practical to apply such higher pressures.

The application of pressure to the material in mold 11, as above described, using fairly coarse fiber introduced to a density of about 0.25 to produce a final product of a density of about 1.0, results in the compression of this material to a relatively thin wafer form having a thickness about one-quarter of the thickness of the material originally charged into the mold, that is, if the mold has charged thereto 1" of the fibrous or powdery material, the application of the pressure, as described, will result in compressing this material to a thickness of about approximately ¼". This phase of the process is illustrated in Figure 3 wherein it is indicated that the ram 12 has entered into die 11 to compress the substance in the mold against the plate 10 as is apparent from inspection of the drawing. With the heating medium circulating through the plate and ram, and with the applied pressure maintained, the compressed wafer is held subjected to such conditions for a period of approximately 10 to 12 minutes, whereupon, without other change of conditions, the internal gaseous pressure within the mold is slowly relieved until such internal gaseous pressure is reduced to substantially atmospheric pressure.

Relief of the internal gaseous pressure within the mold may be accomplished by release through a valve 14 provided in an outlet 13 which passes through the plate 10 to communicate with the interior of the mold, or it may be accomplished by other appropriate means, as, for example, by a slow release of the compression pressure very gradually reduced over a period of several minutes whereby the internal pressure may be slowly substantially released from between the surface of the plate 10 and the top edge of mold 11.

When the internal pressure of the molded product is substantially released as by allowing the gases to escape through pipe 13 and valve 14 the full press pressure is held during this period of escape and for a short period thereafter, say, a minute or two, or on the other hand when the internal pressure is allowed to escape by the release of the compressed pressure as described, then upon the accomplishment of the substantial release of the gaseous pressure the press pressure up to the original full pressure is preferably reapplied for a short period, say, two to four or five minutes as this repressing produces a product having somewhat greater strength than one not having the final step of repressing applied. After the release of the internal pressure and application of the repressing pressure as above described, the mold may then be opened by the release of the press pressure and on elevation of plate 10 the molded wafer formed in mold 11 may be ejected by slight movement of ram 12.

Attention is directed to the fact that during the period of gas pressure release the press pressure must not be reduced at too high a rate since, under such circumstances, the high pressure gases formed within the compressed material, due to the heat and pressure applied, will, under such condition of too rapid release of pressure, explosively disrupt the compressed material or will at least cause portions of the outer surface of the compressed material to raise as blisters and thus spoil the product.

An essential feature in connection with the apparatus above described and in the use thereof in molding products in accordance herewith concerns the seal of the molding chamber, that is, the top plate 10 must tightly fit and seal the upper edge of the mold 11 and plunger 12 must have a sealing fit so that during the pressing period the full gas and vapor pressure developed under the conditions of the applied heat and temperature is retained and held.

In carrying out the molding process as above described, it appears that there is a conversion of the encrusting materials of the cellulosic fibers which materials, other than cellulose, commonly referred to as lignins, comprise various specifically unidentified substances but known to comprise in part carbohydrates and pentosans, and the like, but as stated, comprising largely unidentified substances, generically referred to as lignins. The product produced in accordance with the above, under the conditions of pressure and temperature as above described, clearly shows upon inspection that while subjected to the pressure and temperature conditions, ingredients of the charged material have been converted into substances of the synthetic resin type and that such resins formed in situ within the mix of the cellulosic material, firmly adhere to cellulosic particles into a hard, dense, and strong molded product of the synthetic resin bound type.

As indicative of the fact that there has been chemical changes in the ingredients during the pressing operation, benzol extractions have been made of the divided materials before pressing and it has been found that there were benzol soluble substances present in the amount of 1.9%, whereas the same materials, after pressing, show a benzol soluble content of 3.3%, and further, after molding as above described, it is absolutely impossible to repulp the compressed material and obtain fiber or powdery substance at all similar in form to the material originally charged into the mold. To repulp or attempt to break down the molded material into its original form, it was necessary to break the molded material into small pieces and to subject these plates to a severe steaming action, and even after such procedure, a repulping or reducing action to which they were subjected with the specific object of obtaining fibrous or floury substances such as originally charged into the mold was unsuccessful in that the material was so bound together it could not be reduced to anything like the original form.

While it is as yet impossible to prove, various experiments which have been carried on are believed to clearly indicate that, when raw materials such as have been above described are molded in accordance with the procedure described, there proceed within the compressed and heated material various chemical reactions and combinations which, in effect, in situ, within the compressed material, produce chemical substances which combine and condense to form a binder of the synthetic resin type, as, for example, certain constituents may, by incipient or actual distillation, or other chemical reaction, produce something of a phenolic type of substance, and other ingredients of the mix may likewise create or produce aldehydic type substances, which phenolic and aldehydic type substances then condense to form a synthetic resin of the phenol-aldehyde type.

The explanation just given concerning what is believed to occur during the pressing procedure is, although reasonably supported by various analyses and experiments, stated merely as a theory and it may be that the substances produced and combined are neither of a phenolic or aldehydic type, but nevertheless it is clearly evident for the reasons which have been stated, that there is some reaction of this general nature which results in the formation of a synthetic resin type of binder material which is very evidently distributed throughout and among the remaining cellulosic portion of the molded product, the cellulose content of the original material not being visibly acted upon or altered during the processing and remaining as filling and reinforcing material in the finished product.

In connection with the above described process, the essential and controlling feature of the production of the desired finished product is that during the primary pressing operation the gases and vapors produced within the mass of substance being pressed be retained within such mass. The theory in connection with this feature of the process is that the reactions which proceed within the compressed mass, under the conditions of pressure and temperature of compression, occur only under conditions of high pressure, which high internal pressure within the mass is provided by the gases and vapors retained within the mass when such gases and vapors are formed and expanded in accordance with the temperature conditions applied. If the mass being compressed is sealed during pressing so that the formed and expanded vapors and gases cannot escape, then there is an internal pressure, dependent upon the applied pressure and temperature which is built up within and throughout the compressed mass.

The high internal pressure built up within and throughout the mass during compression, as above discussed, is to be distinguished from the mere pressure of compression which exerts on the compressed mass only such pressure as is transmitted from particle to particle within the body thereof, which condition is very different from one wherein, due to entrapped and expanded gases and vapors, a high internal pressure is built up within the mass, including all the interstices and voids between particles thereof.

The high internal pressure built up within the interior of the mass is apparently essential for the formation of the described resin type binder. A sheet of bagasse fiber compressed under the conditions as hereinbefore described, produces the resin bound product hereof whereas a like sheet of bagasse fiber compressed under the same conditions, except that the internal pressure therein is not maintained as described, does not show development of the resin bond and the product resulting has little or no strength and, in fact, is nothing but a compressed mass of fiber.

Again as a theory only, but one which appears to be borne out by facts discovered, it appears that the gases formed in the fiber mass when subjected to the heat and pressure of pressing and retained in the compressed mass as high pressure gases act as a catalyst in the reactions which occur or actually enter into the chemical actions involved. A clear indication that this theory is correct, though not fully understood, is indicated by the fact that if these gases are not brought up to the high pressure and temperature by sealing these gases in, the product does not show the resin bond.

A molded product made in accordance with the above procedure from bagasse fiber, having average normal moisture content of 7½%, had a density of over 1.0 and tensile strength well in excess of 3000 pounds per square inch. Such strength is extremely high, particularly considering that such strength is derived from the relatively small part of the material which is available for and converted into the resinous binder.

As alternative of actual molding, as described in connection with the process illustrated in Figures 1 to 4 in which the material being compressed is actually sealed in a mold, the pressing operation may be otherwise carried out in different apparatus to achieve the same final result, as will be pointed out.

To produce a flat sheet of material, in accordance with the invention hereof, having length and breadth dimensions relatively great in proportion to thickness, there may preferably be used apparatus such as is indicated in Figure 5. In Figure 5 the plate 10 remains a press plate, ram 12 becomes a similar but opposed press plate and mold 11 becomes a gasket indicated at 16; or otherwise stated, the apparatus comprises opposed press plates 10 and 12 with a sealing gasket 16 provided to form a seal during the pressing operation. Plates 10 and 12 are each cored for heating fluid with inlet and outlet pipes 15 and there is means for applying press pressure as by plungers 20. The faces of plates 10 and 12 may be the material of the plates but it will, of course, be understood that for the pressure applying faces thereof, there may be mounted thereon relatively thin sheets of stainless steel, blue annealed steel or any of the alloys which will provide hard smooth surface faces, or the faces may be appropriately plated or otherwise treated.

To make a molded sheet product in accordance with the invention hereof, say 3' x 4' by ⅛", the press plates, as shown in Figure 5 will be somewhat longer than the stated dimensions, say 3' 4" to 6" by 4' 4" to 6". The prepared material, prepared as above described, conveniently in the form of a sheet of fiber insulation board about 3' 1" by 4' 1" by ½" thick, of a density about 0.26, having normal atmospheric moisture content of around 8% to 9%, is placed between press plates 10 and 12. Around the edges of the fiber sheet there is placed a gasket 16 which may be a strip of deformable material such as lead or soft copper, or the like, or which may be of hard material approximately the thickness of the finished pressed product.

When pressure is brought on a sheet, such as described, by closing the press plates, the soft board is quickly compressed to substantially the final thickness and the gasket 16 serves to seal the edges with the same effect as mold 11 of Figure 1, to retain, in the material being compressed, the vapors and gases formed and expanded due to the conditions of pressure and temperature of pressing as has been described.

In Figure 6 there is shown a modification of the form of apparatus shown in Figure 5 and in which gasket 16 is replaced by a rather narrow ridge or projection 17 preferably formed on the face of press plate 10, on the face itself if a separate press plate as mentioned is not used, or, in the plate or attached thereto if a separate press plate is used. Such ridge or projection 17, as the press closes, serves to super-compress that portion of the fiber sheet 18 near its edges as indicated at 21, which super-compressed fiber acts as a vapor and gas stop to prevent egress thereof from interior of the sheet being pressed. The same effect may be achieved by placing on the fiber sheet adjacent to the edges thereof a narrow strip of material or a wire or the like to serve the same purpose as the ridge or projection 17 just before described.

Figure 7 shows a still further modification of the apparatus in which a screen, or screen-like member, 21 is secured to or mounted on press plate 10, with or without the interposition of a separate press face plate. At the edges of the screen there are provided edge seals 22, it being understood that the screen is exaggerated in the illustration and that the seal members 22 serve to seal the material being pressed, as described in connection with seal members 16 and 17, Figures 5 and 6.

The screen 21 serves to produce a screen marking on a surface of the finished product and it also serves to provide channels for quicker passage of entrapped gases and vapors to the edges for escape when the press pressure is released, as will be understood.

When the members 21 are screen-like as mentioned, it is to be understood that like purpose and effect may be achieved by the use of press plates mentioned, having lines or figures on the surface, in relief or intaglio, to correspondingly produce on the surface of the finished product such pattern raised above the surface or pressed therein.

While optimum conditions of manufacture hereunder were particularly pointed out, it is to be realized that between the limits mentioned there will be a variation of characteristics of the molded product produced. In the range of the lowest pressure and temperature mentioned, the product will be of a lower density, probably around 0.8 and tensile strength will be down correspondingly to around 1600 pounds per square inch. In the upper range of pressure and temperature conditions the product will probably be of a density approaching 1.2 and tensile strength approaching or exceeding 4000 pounds per square inch. The figures just given apply to a molded product produced from a distinctly fibrous bagasse. If the primary material is flour-like rather than fibrous, it can usually be expected to pack somewhat more than fiber, to produce a slightly higher density product, which, because without the reinforcement afforded by fibers, is generally of lower tensile strength compared to the product made from fiber as the primary material.

A very important feature, particularly in connection with practical use of the invention hereof, although not of particular importance in connection with the basic invention hereof, is in that much of the art and knowledge which has been developed in connection with synthetic resin molding is generally applicable to the practice of this invention. To the raw material as hereinbefore described, prepared as directed, there may be added additional binder material if a final product containing a greater percentage of binder than that formed in the simple practice of the invention is desired. For example, there may be added to the disintegrated fiber a percentage of a phenol-formaldehyde resin partially reacted, as well known, or there may likewise be added a percentage of other known resin forming combinations or polymerizing and oxidizing oils such as tung oil or linseed oil or the like.

Relatively small amounts, say from 2% to 5% of added binders such as above described will produce a greater relative increase in the strength of the final product, as may well be understood, but in general the greater the amount of such added binder added the greater will be the strength of the final product.

The produce may, of course, be produced from a single kind of fiber or there may be combined a plurality of the raw materials, and further, for the production of products having special characteristics there may be admixed therewith limited amounts of other fibers, for example, relatively long and tough fibers such as flax fiber, or there may be admixed therewith filler materials such as whiting, elaterite and other finely divided substances employed generally to impart color to the final product. Such added fiber or filler material cannot be used to too great a proportion, to 10% or in some cases up to about 20% being apparently the upper limit. In case, though, added binder is used, as has been described, the percentage of added fiber or filler can be increased. If added binder to the amount of 10% is used, then added fiber or filler up to about 20% to 30% is permissible.

In making a product in accordance with the disclosure hereof it may be desired to obtain waterproofness of the finished product greater than normally provided by the process as described. In such case the basic fiber may be treated with an alum and rosin size, or a paraffin size, or tung oil size, or the like, as is understood in the paper and fiber board industry, and in such case the application of waterproofing to the fiber will result in a final product having a higher degree of waterproofing than one produced from fiber not so treated.

It is to be understood that, as described, the sealing of the edge of the material being compressed is intended not necessarily to include a complete edge seal of the body of the material. The seal to be considered is such seal as described, which, under the circumstances, will accomplish the desired results. For example, in molding a relatively small disc, rather thick, a complete edge seal should be provided but in molding a rectangular sheet, rather thin and having a length, say, several times its width, it is ordinarily sufficient to seal only the long edges. The requirement is that the seal be sufficient that under the conditions of molding the escape of expanded steam and gases be restricted sufficiently to build up the required internal pressure to bring about the desired reactions.

It has been found that the reactions occurring during the described molding operation may be more or less assisted or hastened by the use of certain catalysts as in connection with molding with the conventional synthetic resins. Because of this, in some instances it may be advisable to add, before compression, to the mass to be compressed a small amount of a catalyst, say, a fraction of a per cent of hexamethylene tetramine or aniline hydrochloride or of one of the other various acid or alkali or alkali hydroxide or carbonate catalysts such as are used in conventional synthetic molding operations. Of course these various catalysts do not each produce equal results in assisting in the resin formation during compression but it appears that any of such catalysts do to at least some extent aid in the resin formation.

The inventions hereof having been disclosed in detail, we claim:

1. The process of forming molded products from a mass of ligneous cellulose fibers having a moisture content of between 5 and 15% which comprises the steps: compacting the mass by the application of pressure while the mass is subjected to heat of 240 to 300 degrees F., holding the mass so compacted and heated for a period of about 10 minutes to cause substantially complete polymerization of constituents of the mass whereby a water insoluble resinous binder is formed, and sealing the mass of ligneous cellulose fibers while it is so subjected to the heat and pressure to retain the gases and vapors thereof to cause substantially complete polymerization of the mass of constituents of ligneous cellulose fibers.

2. The process of producing resinous products from ligneous cellulose fiber having a moisture content of substantially 6 to 12% on the weight of the dry fiber, which comprises the steps: compressing the ligneous cellulose fiber in a closed chamber by a presure between the limits of substantially 500 to 1500 pounds per square inch, and heating the cellulose fiber to a temperature between the limits of 400° F., plus or minus 100° F. to cause substantially complete resinification of a constituent of the ligneous cellulose fiber.

3. The process of producing resinous products from ligneous cellulose fiber which comprises the steps: compressing and heating the ligneous cellulose fiber in the presence of moisture in a closed chamber, maintaining during resin formation the internal gas and vapor pressure produced within the mass ligneous cellulose fiber due to the heat applied, and slowly decreasing the internal gas and vapor pressure substantially to atmospheric pressure.

4. The process of forming molded products from ligneous cellulose fibers having a moisture content of substantially 9% which comprises the steps: compressing and heating the ligneous cellulose fibers in a mold causing the formation of vapors, restraining the vapors formed within the mold, subjecting the vapors formed to the heat and pressure during a period of resin formation, and releasing the pressure slowly with simultaneous release of the contained vapors and gases to cause substantially complete resinification of a constituent part of the ligneous cellulose fibers.

5. A process of molding a material comprising lignins and cellulose in a mold which comprises the steps: substantially sealing the mold against the escape therefrom of gases and vapors formed from the material, subjecting the material to heat and pressure, relieving the pressure slowly allowing the escape of entrapped vapors and gases, and fully relieving the molding pressure to cause substantially complete resinification within the material.

6. The process of molding from moist ligneous cellulose substance having a moisture content of about 9%, a hard dense product which comprises the steps: compressing the ligneous cellulose substance with simultaneous application of heat at a temperature of about 240 degrees to 325 degrees F. to cause the substance to be compacted and thoroughly heated and a high internal pressure to be built up within the mass of the substance being compressed through conversion of the moisture contained therein into steam and expansion of the steam and contained gases, restraining the free escape of the expanded steam and gases from the substance being compressed, slowly lowering the compression pressure to cause the excess internal pressure to be relieved, and recompressing the substance during a short period to cause a hard and dense product to be formed.

7. A molded product comprising ligneous cellulose fibers originally characterized by a benzol extraction of substantially 1.9% solubles, the fibers adhered and bound together by reaction products of the such ligneous cellulose fibers reacted in situ, whereby the molded product is characterized by a benzol extraction of substantially 3.3% solubles.

8. A hard, dense and homogeneous molded product comprising resinous reaction products of ligneous cellulose fiber characterized by a benzol extraction of substantially 3.3% solubles having throughout the body thereof an interspersed reinforcement comprising the unreacted remainder of the such ligneous cellulose fiber.

9. The resinous product produced by subjecting a mass of moist bagasse fiber simultaneously to elevated temperature and high pressure while restrained to prevent the escape of gases and vapors from such mass during its subjection to the elevated temperature and high pressure.

10. The process of molding, from moist ligneous cellulose substance having a moisture content of about 9%, a hard and dense product which comprises the steps: compressing the ligneous cellulose substance with simultaneous application of heat, the creation of a high internal pressure built up within the mass of the substance being compressed through conversion of the moisture contained therein into steam and expansion of the steam and contained gases, and providing a seal restraining the free escape of the expanded steam and gases from the substance being compressed.

11. The method of producing a hard, dense, coherent and homogeneous resinified product which comprises the steps: charging a ligno-cellulose substance in finely sub-divided form into a mold of variable internal volume, reducing the volume of the mold to cause an external pressure to be exerted on the charged substance of between 500 and 1500 pounds per square inch, concurrently subjecting the compressed substance to a temperature of between 240 and 440 degrees Fahrenheit causing an internal pressure to be formed within the compressed mass, maintaining the aforesaid conditions for a period of about ten (10) minutes, maintaining the internal pressure within the compressed mass during such period of treatment, slowly releasing the internal pressure, and maintaining the external pressure and heating for a period of several minutes after the release of the internal pressure.

12. The method of producing a hard, dense, coherent and homogeneous resinified product which comprises the steps: treating a ligno-cellulose substance in finely divided form with a waterproofing selected from the group of usual paper waterproofing substance—rosin, paraffine, and tung oil, charging the treated ligno-cellulose substance into a mold of variable internal volume, reducing the volume of the mold to cause an external pressure to be exerted on the charged substance of between 500 and 1500 pounds per square inch, concurrently subjecting the compressed substance to a temperature of between 240 and 440 degrees Fahrenheit causing an internal pressure to be formed within the compressed mass, maintaining the aforesaid conditions for a period of about ten (10) minutes, maintaining the internal pressure within the compressed mass during such period of treatment, slowly releasing the internal pressure, and maintaining the external pressure and heating for a period of several minutes after the release of the internal pressure.

13. The method of producing a hard, dense, coherent and homogeneous resinified product which comprises the steps: charging a molding charge comprising divided ligno-cellulose, and a catalyst into a mold of variable internal volume, reducing the volume of the mold to cause an external pressure to be exerted on the charged substance of between 500 and 1500 pounds per square inch, concurrently subjecting the compressed substance to a temperature of between 240 and 440 degrees Fahrenheit causing an internal pressure to be formed within the compressed mass, maintaining the aforesaid conditions for a period of about ten (10) minutes, maintaining the internal pressure within the compressed mass during such period of treatment, releasing the internal pressure, and maintaining the external pressure and heating for a period of several minutes after the release of the internal pressure.

14. The method of producing a hard, dense, coherent and homogeneous resinified product which comprises the steps: charging a ligno-cellulose substance in finely divided form and a catalyst comprising material selected from the group of catalysts comprising hexamethylene tetramine, analine hydrochloride, acid catalysts, alkali catalysts, alkali hydroxide catalysts, and carbonate catalysts, into a mold of variable internal volume, reducing the volume of the mold to cause an external pressure to be exerted on the charged substance of between 500 and 1500 pounds per square inch, concurrently subjecting the compressed substance to a temperature of between 240 and 440 degrees Fahrenheit causing an internal pressure to be formed within the compressed mass, maintaining the aforesaid conditions for a period of about ten (10) minutes, maintaining the internal pressure within the compressed mass during such period of treatment, releasing the internal pressure, and maintaining the external pressure and heating for a period of several minutes after the release of the internal pressure.

15. A process for producing substantially fiberless homogeneous masses from woody material, consisting in steaming the woody material in a pressure-tight vessel at a temperature above 150° C. and under a mechanical pressure of at least 100 atmospheres, until a practically fiberless homogeneous material is obtained, and molding said material by the action of heat and mechanically exerted pressure in the presence of saturated steam in the same pressure-tight vessel to form molded solid masses of low water and ash content.

16. The process of molding a body which comprises the steps: heating and compressing the body, a narrow width of the body at and around the perimeter thereof being first compressed to prevent the escape of gases from the interior portion of the body to the exterior, the compression of that portion of the body interiorly of said compressed narrow width of the body at and around the perimeter thereof while continuing and increasing the compression of the said narrow width of the body at and about the perimeter thereof, and thereby securely sealing the outer edge of the body against the escape of gases and vapor therethrough and causing an internal gas and vapor pressure to build up within the body and to be maintained during the compression thereof.

FERGUS A. IRVINE.
EMILE FREDERICK, JR.